(12) United States Patent
Jo et al.

(10) Patent No.: US 12,597,658 B2
(45) Date of Patent: Apr. 7, 2026

(54) SECONDARY BATTERY, BATTERY PACK, AND AUTOMOBILE

(71) Applicant: LG ENERGY SOLUTION, LTD., Seoul (KR)

(72) Inventors: Minki Jo, Daejeon (KR); Do Gyun Kim, Daejeon (KR); Kwang Su Hwang Bo, Daejeon (KR); Geon Woo Min, Daejeon (KR); Suji Choi, Daejeon (KR); Bohyun Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 508 days.

(21) Appl. No.: 18/035,706

(22) PCT Filed: Feb. 23, 2022

(86) PCT No.: PCT/KR2022/002677
§ 371 (c)(1),
(2) Date: May 5, 2023

(87) PCT Pub. No.: WO2022/182144
PCT Pub. Date: Sep. 1, 2022

(65) Prior Publication Data
US 2023/0402690 A1 Dec. 14, 2023

(30) Foreign Application Priority Data
Feb. 23, 2021 (KR) ........................ 10-2021-0024422

(51) Int. Cl.
| | |
|---|---|
| *H01M 50/152* | (2021.01) |
| *H01M 50/107* | (2021.01) |
| *H01M 50/159* | (2021.01) |
| *H01M 50/167* | (2021.01) |
| *H01M 50/531* | (2021.01) |
| *H01M 50/545* | (2021.01) |
| *H01M 50/55* | (2021.01) |

(Continued)

(52) U.S. Cl.
CPC ....... *H01M 50/152* (2021.01); *H01M 50/107* (2021.01); *H01M 50/159* (2021.01);
(Continued)

(58) Field of Classification Search
CPC .... H01M 50/55; H01M 50/59; H01M 50/107; H01M 50/152; H01M 50/159;
(Continued)

(56) References Cited

U.S. PATENT DOCUMENTS

| | | | | |
|---|---|---|---|---|
| 5,609,972 A | * | 3/1997 | Kaschmitter | ....... H01M 50/583 429/61 |
| 7,807,285 B1 | * | 10/2010 | Berg | ................... H01M 50/543 429/211 |

(Continued)

FOREIGN PATENT DOCUMENTS

| | | |
|---|---|---|
| CN | 207743262 U | 8/2018 |
| CN | 111446386 A | 7/2020 |

(Continued)

OTHER PUBLICATIONS

Korean Office Action for Korean Application No. 10-2022-0023947, dated Jun. 9, 2025, with English translation.
(Continued)

*Primary Examiner* — Brian K Talbot
(74) *Attorney, Agent, or Firm* — Birch, Stewart, Kolasch & Birch, LLP

(57) ABSTRACT

A secondary battery includes an electrode assembly having a first electrode tab and a second electrode tab, a battery can electrically connected to the second electrode tab and having an opening portion accommodating the electrode assembly, a top cap covering the opening portion of the battery can and electrically connected to the first electrode tab, a conductive washer electrically connected to the battery can and adjoining a peripheral portion of the opening portion, and an (Continued)

insulative member provided between the top cap and the battery can and the conductive washer electrically connected to the battery can, the insulative member being configured to electrically insulate the top cap and at least one of the battery can and the conductive washer. The top cap includes first and second surfaces facing each other, the second surface having a protruding portion exposed through a hole formed in a central portion of the conductive washer.

18 Claims, 16 Drawing Sheets

(51) Int. Cl.
    *H01M 50/559*     (2021.01)
    *H01M 50/588*     (2021.01)
    *H01M 50/59*     (2021.01)

(52) U.S. Cl.
    CPC ....... *H01M 50/167* (2021.01); *H01M 50/531* (2021.01); *H01M 50/545* (2021.01); *H01M 50/55* (2021.01); *H01M 50/559* (2021.01); *H01M 50/588* (2021.01); *H01M 50/59* (2021.01); *H01M 2200/20* (2013.01); *H01M 2220/20* (2013.01)

(58) Field of Classification Search
    CPC ............ H01M 50/167; H01M 50/531; H01M 50/545; H01M 50/559; H01M 50/588; H01M 2200/20; H01M 2220/20
    USPC .......................................................... 429/56
    See application file for complete search history.

(56) References Cited

U.S. PATENT DOCUMENTS

| | | | | |
|---|---|---|---|---|
| 8,962,180 B2 * | 2/2015 | Byun | ................. | H01M 50/188 429/178 |
| 10,431,853 B2 * | 10/2019 | Pasma | ................. | H01M 50/166 |

| | | | | |
|---|---|---|---|---|
| 2003/0104276 A1 * | 6/2003 | Mizuno | ............... | H01M 50/172 429/211 |
| 2003/0124420 A1 * | 7/2003 | Fong | ................... | H01M 50/567 429/184 |
| 2006/0183020 A1 * | 8/2006 | Davidson | ............ | H01M 50/184 429/165 |
| 2010/0136424 A1 * | 6/2010 | Hermann | ............ | H01M 10/653 429/186 |
| 2013/0337341 A1 * | 12/2013 | Tikhonov | .......... | H01M 10/0569 429/326 |
| 2017/0077503 A1 * | 3/2017 | Erickson | ............ | H01M 10/052 |
| 2020/0044289 A1 | 2/2020 | Pasma et al. | | |
| 2020/0083494 A1 | 3/2020 | Bae | | |
| 2021/0175568 A1 | 6/2021 | Geshi et al. | | |
| 2021/0210782 A1 | 7/2021 | Muksi et al. | | |

FOREIGN PATENT DOCUMENTS

| | | | | | |
|---|---|---|---|---|---|
| CN | 111566848 A | 8/2020 | | | |
| EP | 2 752 912 B1 | 3/2019 | | | |
| EP | 4 175 030 A1 | 5/2023 | | | |
| JP | 2011-23355 A | 2/2011 | | | |
| JP | 2019-145478 A | 8/2019 | | | |
| KR | 10-2015-0069779 A | 6/2015 | | | |
| KR | 10-2018-0057362 A | 5/2018 | | | |
| KR | 10-2020-0020173 A | 2/2020 | | | |
| WO | WO 2018/194182 A1 | 10/2019 | | | |
| WO | WO 2019/194055 A1 | 10/2019 | | | |
| WO | WO-2019194182 A1 * | 10/2019 | .......... | H01M 50/531 |

OTHER PUBLICATIONS

Extended European Search Report for European Application No. 22760060.8, dated Apr. 14, 2025.
International Search Report for PCT/KR2022/002677 mailed on Jun. 9, 2022.
Japanese Office Action for Japanese Application No. 2023-527797, dated Jun. 3, 2024, with English translation.

* cited by examiner

[FIG. 1]
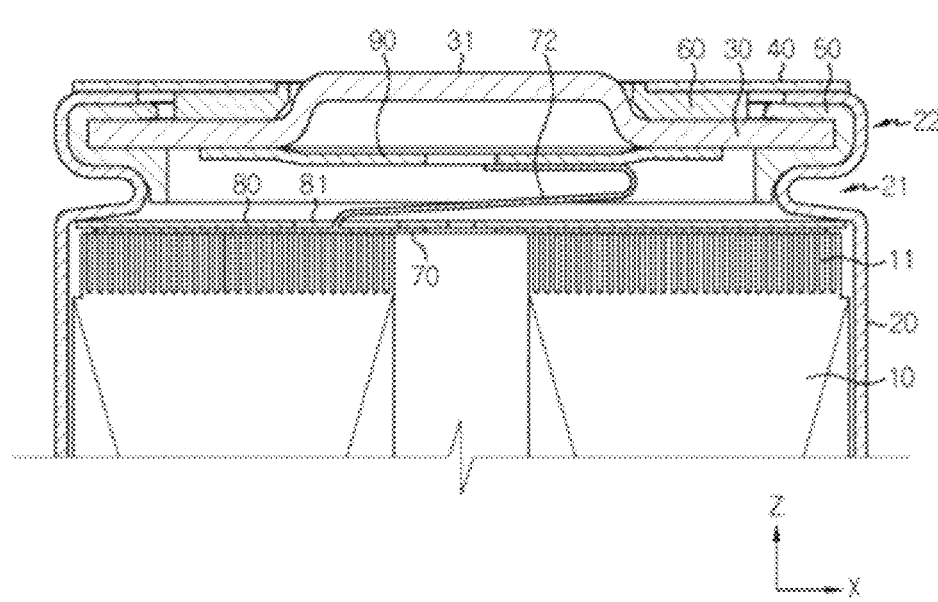

[FIG. 2]
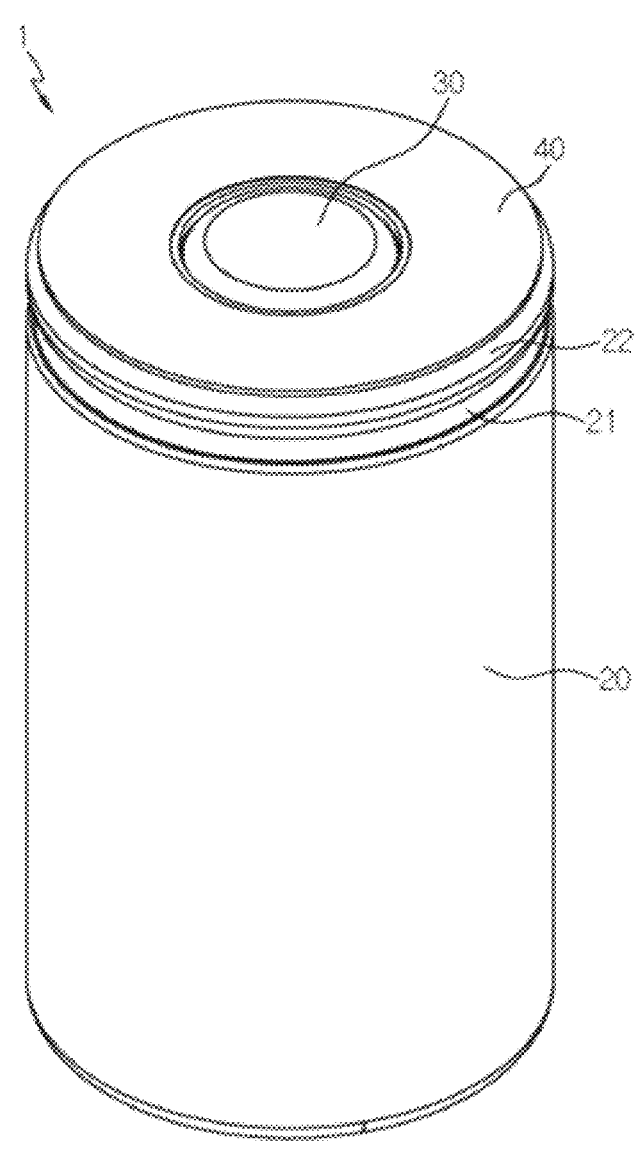

[FIG. 3]
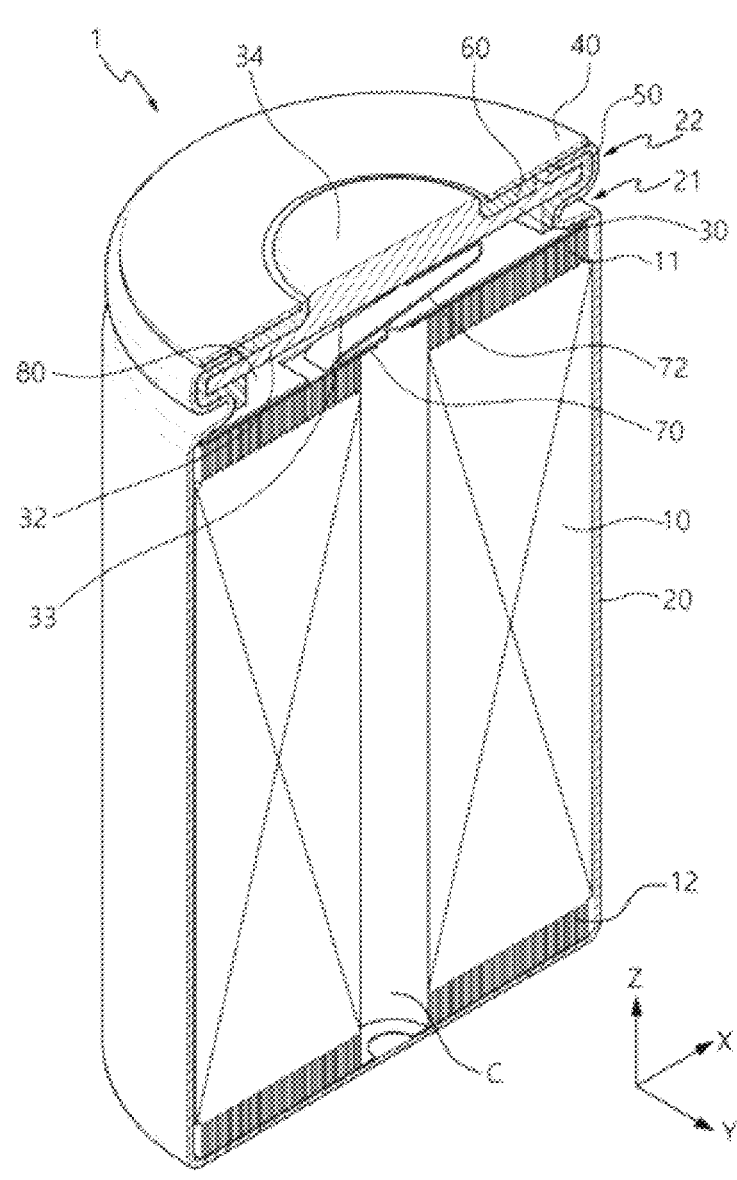

[FIG. 4]
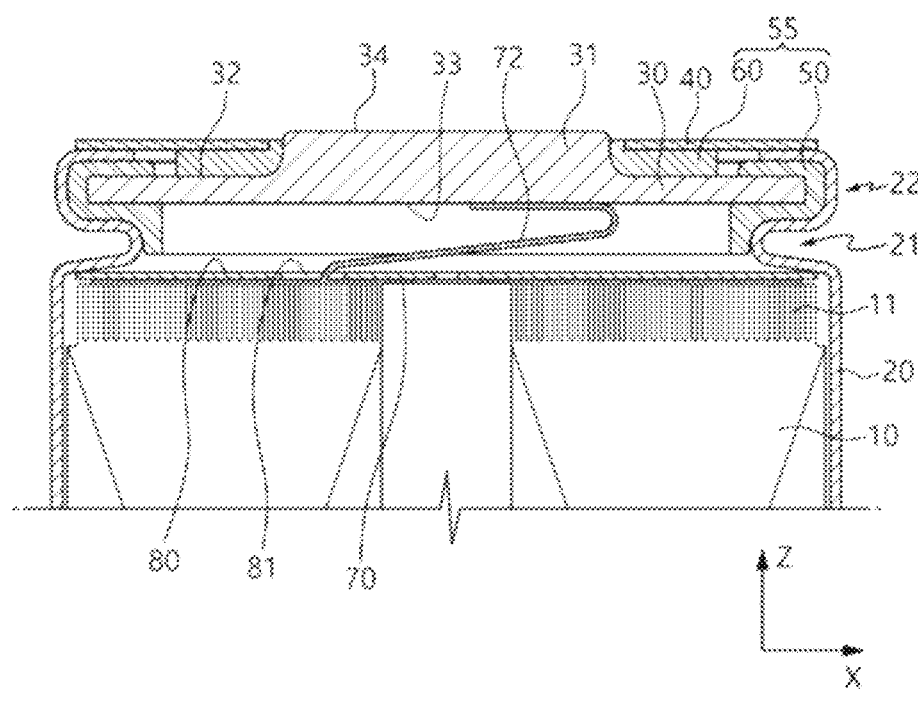

[FIG. 5]
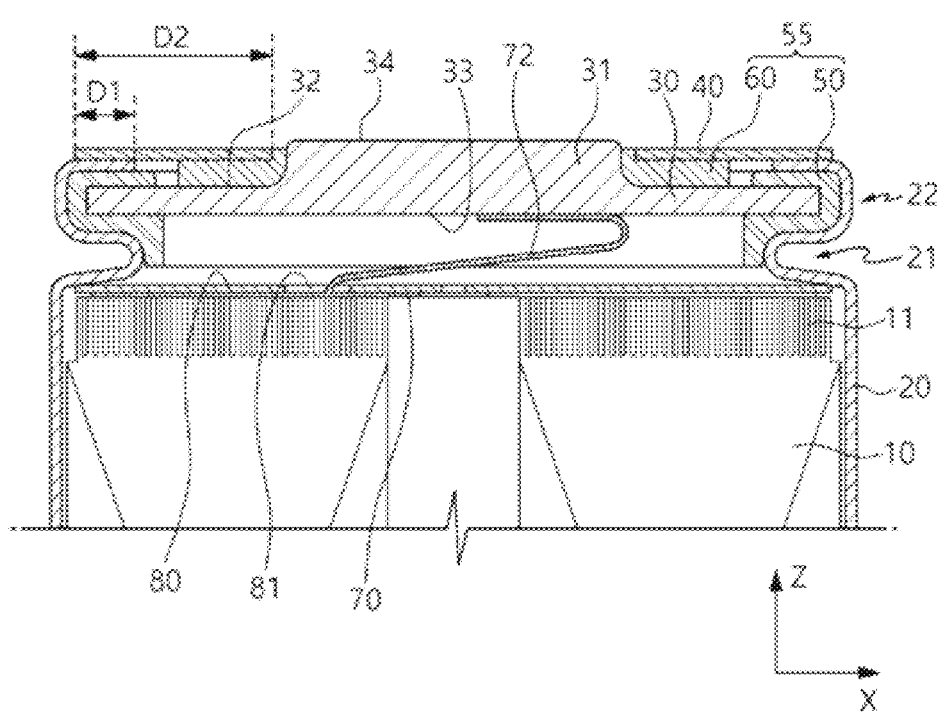

[FIG. 6]
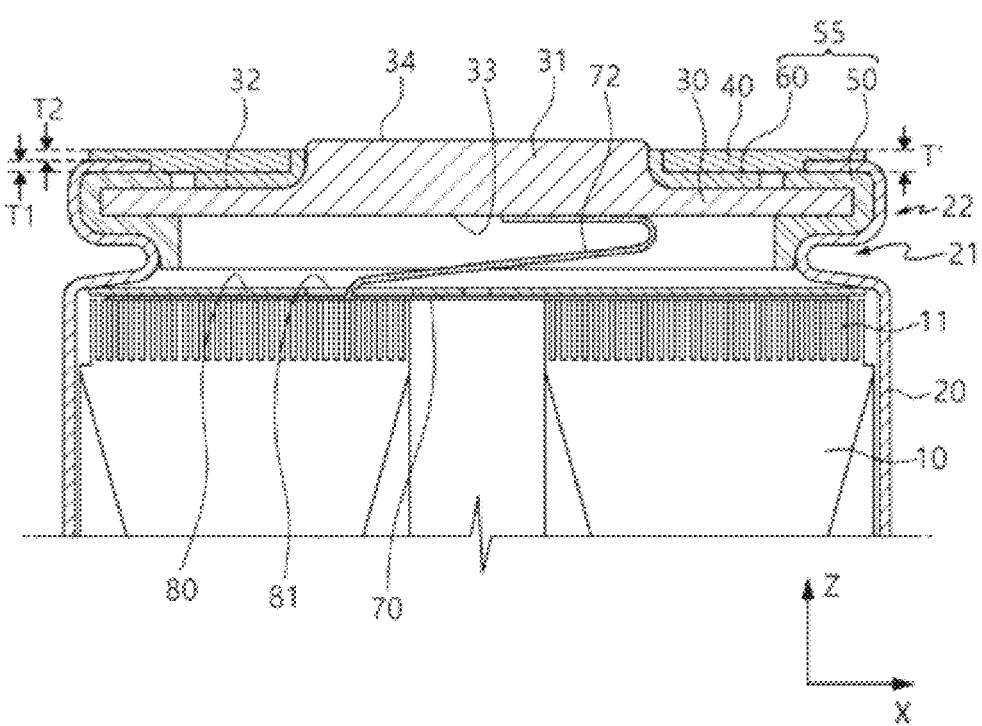

[FIG. 7]
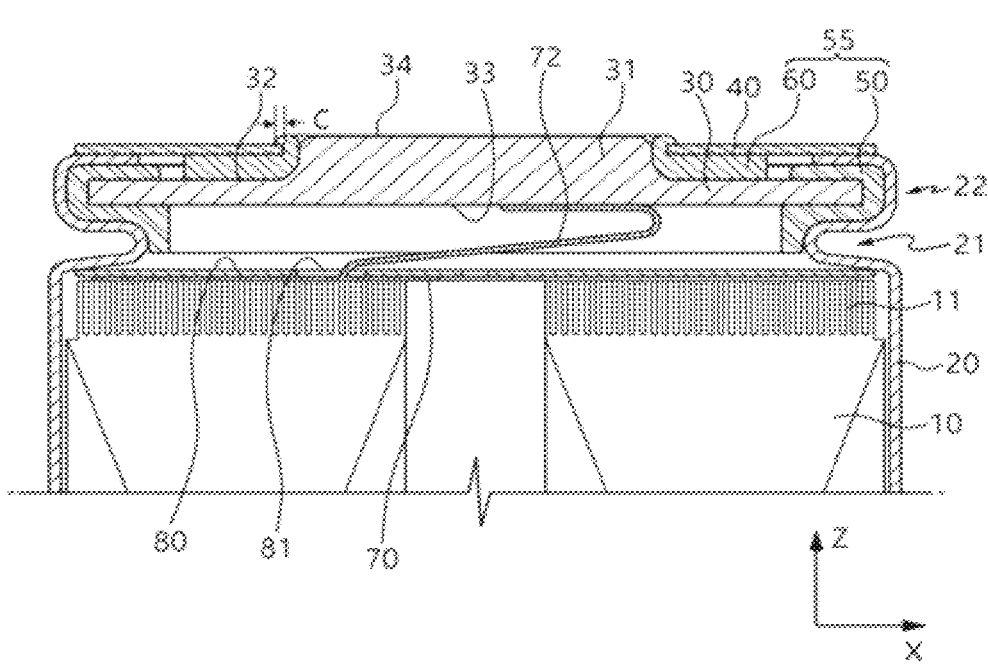

[FIG. 8]
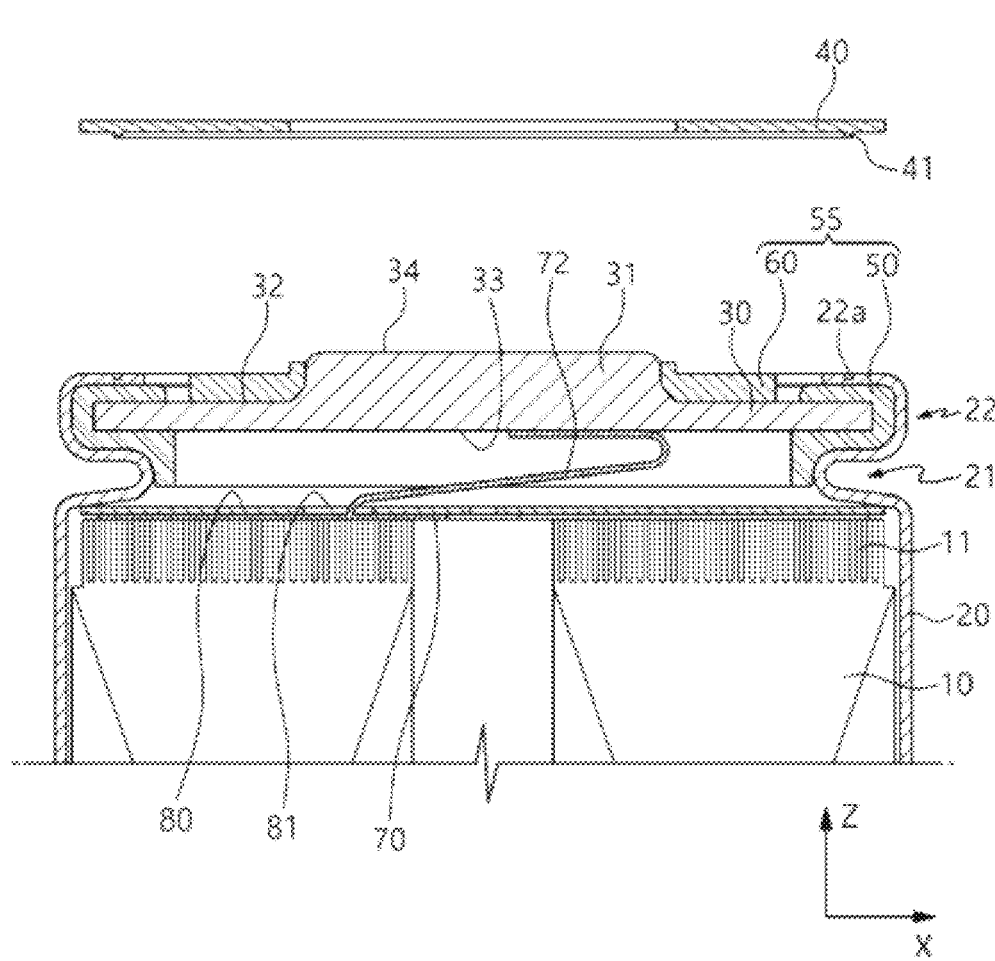

[FIG. 9]
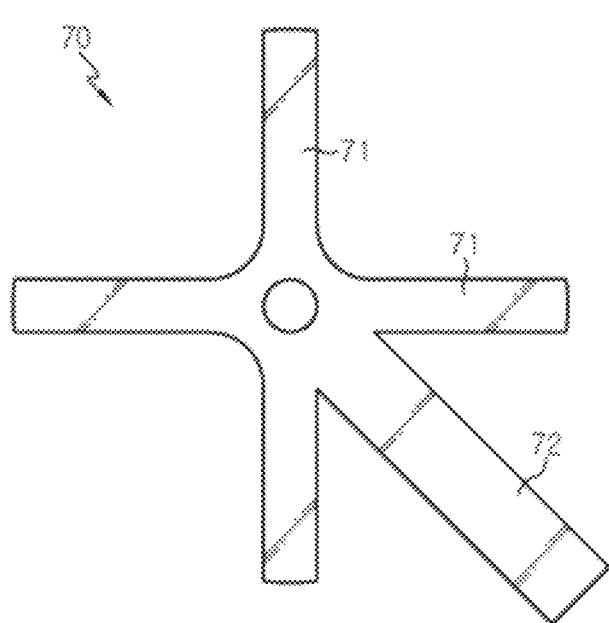

[FIG. 10]
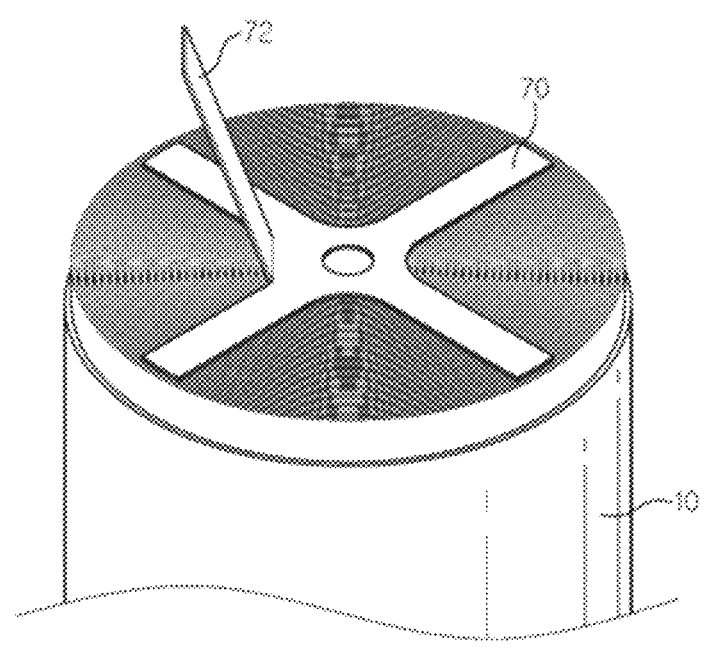

[FIG. 11]
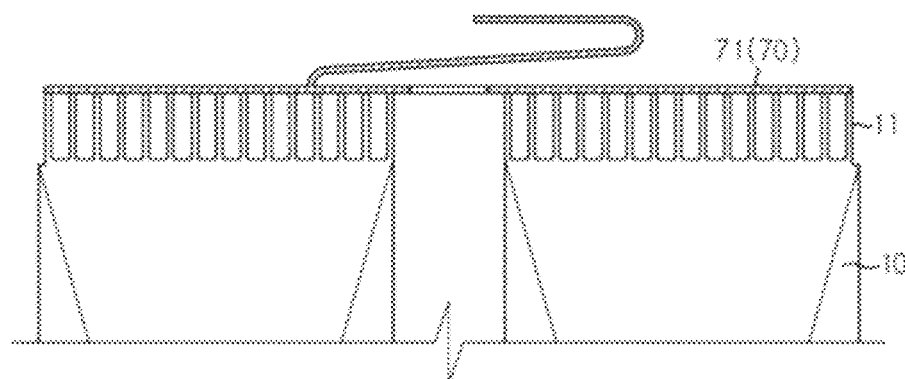

[FIG. 12]
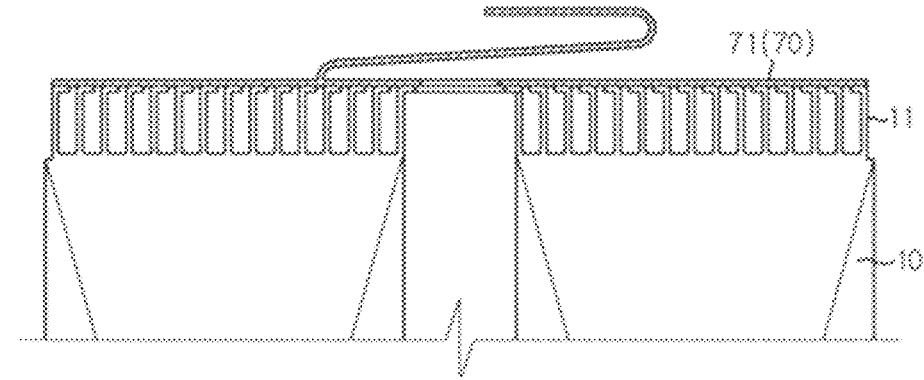

[FIG. 13]
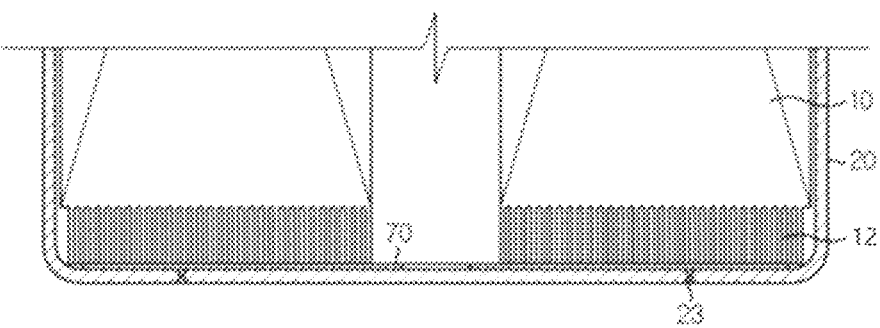

[FIG. 14]
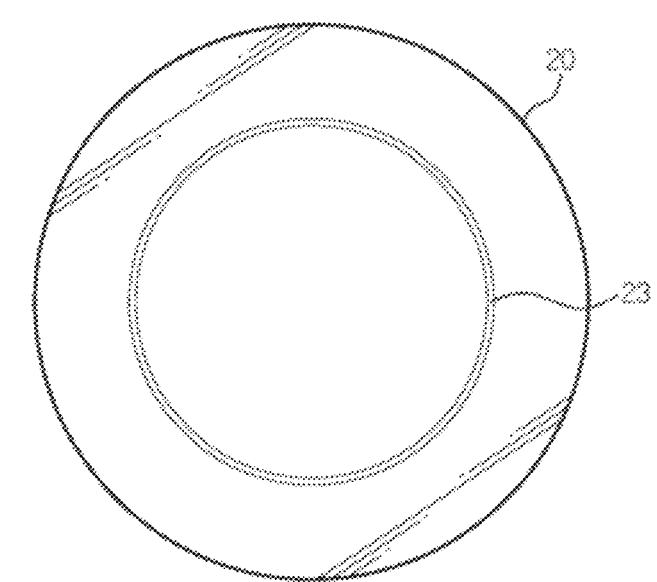

[FIG. 15]
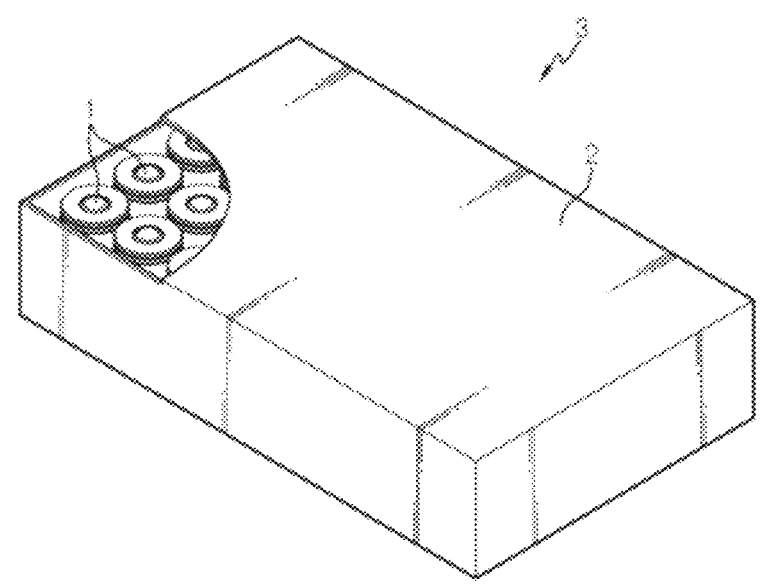

[FIG. 16]
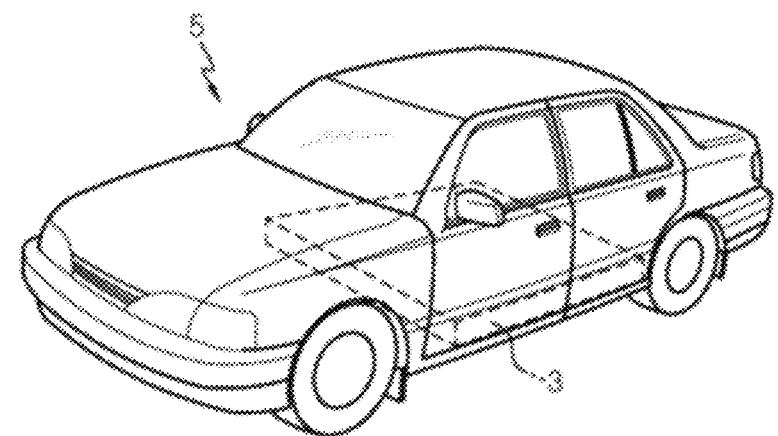

SECONDARY BATTERY, BATTERY PACK, AND AUTOMOBILE

TECHNICAL FIELD

This application claims priority to and the benefit of Korean Patent Application No. 10-2021-0024422 filed with the Korean Intellectual Property Office on Feb. 23, 2021, the entire contents of which are incorporated herein by reference.

The present invention relates to a secondary battery, a battery pack, and an automobile.

BACKGROUND ART

A secondary battery is easy to apply to product groups and has electrical characteristics such as high energy density. Therefore, the secondary battery is widely applied not only to portable devices but also to electric automobiles (EVs) or hybrid electric automobiles (HEVs) driven by electrical driving sources.

The secondary battery attracts attention as a new energy source for improving environmental-friendly characteristics and energy efficiency because the secondary battery achieves a primary advantage of innovatively reducing the use of fossil fuel and does not generate any by-products from the use of energy.

Types of secondary batteries currently used widely include a lithium-ion battery, a lithium-polymer battery, a nickel-cadmium battery, a nickel-hydrogen battery, a nickel-zinc battery, and the like. An operating voltage of a unit secondary battery, i.e., a unit battery is about 2.5 V to 4.5 V. Therefore, when an output voltage higher than the operating voltage is required, a plurality of secondary batteries is connected in series and constitutes a battery pack. In addition, the plurality of secondary batteries is connected in parallel and constitutes the battery pack depending on a charge/discharge capacity required for the battery pack. Therefore, the number of secondary batteries included in the battery pack and the type of electrical connection between the secondary batteries may be variously set depending on required output voltages and/or charge/discharge capacities.

To manufacture a battery pack by using a cylindrical secondary battery, typically, a plurality of cylindrical secondary batteries is disposed upright in a housing, and the plurality of cylindrical secondary batteries is electrically connected to each other by connecting upper ends and lower ends of the cylindrical secondary batteries by using positive electrode terminals and negative electrode terminals.

This is because a negative electrode non-coated portion of an electrode assembly accommodated in a battery can extend downward and is electrically connected to a bottom surface of the battery can, and a positive electrode non-coated portion extends upward and is electrically connected to a top cap in the cylindrical secondary battery. That is, in the cylindrical secondary battery, the bottom surface of the battery can is generally used as a negative electrode terminal, and the top cap configured to cover an upper end opening portion of the battery can is generally used as a positive electrode terminal.

However, when the positive electrode terminal and the negative electrode terminal of the cylindrical secondary battery are positioned at the opposite positions, electrical connection components such as busbars for electrically connecting the plurality of cylindrical secondary batteries need to be applied to both the upper and lower portions of the cylindrical secondary battery. This complicates an electrical connection structure of the battery pack.

Moreover, in the above-mentioned structure, components for ensuring electrical insulation and components for ensuring waterproofness need to be individually applied to the upper and lower portions of the battery pack, which increases the number of components to be applied and complicates the structure.

Accordingly, there is a need to develop a cylindrical secondary battery having a structure in which a positive electrode terminal and a negative electrode terminal are provided in the same direction in order to simplify an electrical connection structure between a plurality of cylindrical secondary batteries.

DETAILED DESCRIPTION OF THE INVENTION

Technical Problem

An object of the present invention is to provide a secondary battery that has a structure in which a positive electrode terminal and a negative electrode terminal are provided in the same direction, and a top cap, which serves as a positive electrode terminal, and a component, which is used to weld a tab extending from an electrode assembly, are integrally coupled, thereby implementing high energy density.

Another object of the present invention is to provide a battery pack and an automobile including the above-mentioned secondary battery.

However, technical problems to be solved by the present invention are not limited to the above-mentioned technical problems, and other technical problems, which are not mentioned above, may be clearly understood by those skilled in the art from the following description of the invention.

Technical Solution

An embodiment of the present invention provides a secondary battery including: an electrode assembly having a first electrode tab and a second electrode tab; a battery can electrically connected to the second electrode tab, the battery can having an opening portion configured to accommodate the electrode assembly; a top cap configured to cover the opening portion of the battery can, the top cap being electrically connected to the first electrode tab; a conductive washer electrically connected to the battery can, the conductive washer adjoining at least a portion of a peripheral portion of the opening portion; and an insulative member located between the top cap and at least one of the battery can and the conductive washer, the insulative member being configured to electrically insulate the top cap from the at least one of the battery can and the conductive washer, in which the top cap includes a first surface and second surface opposite each other, the first surface facing the electrode assembly, the first surface being electrically connected to the first electrode tab, and the second surface having a protruding portion exposed through a hole located at a central portion of the conductive washer.

Another embodiment of the present invention provides a battery pack including: the secondary battery according to the above-mentioned embodiment; and a pack housing configured to accommodate the secondary battery.

Still another embodiment of the present invention provides an automobile including the battery pack according to the above-mentioned embodiment.

Advantageous Effects

When the conductive washer is applied to apply the cylindrical secondary battery having the structure in which the positive electrode terminal and the negative electrode terminal are provided in the same direction, the top cap, which serves as the positive electrode terminal to obtain the conductive washer having a sufficiently large width, may be applied in the form having the protruding portion protruding to the outside of the battery can. The top cap having the protruding portion may be manufactured by pressing, and the connection plate, which is the intermediate component capable of being electrically connected to the electrode assembly, may be attached to the lower portion of the top cap.

According to the embodiment of the present invention, a separate connection plate is not attached to a top cap that serves as the positive electrode terminal, but the tab extended from the electrode assembly may be attached directly to the top cap including the protruding portion by welding. In this case, it is possible to reduce the number of components for electrical connection and thus reduce component resistance. In addition, the application of the above-mentioned configuration may increase rigidity of the top cap by means of a top cap component manufactured by forging.

According to another embodiment of the present invention, the reduction in resistance at the top cap may ensure low electrical resistance of the positive electrode terminal and thus increase energy density of the secondary battery, thereby increasing a battery size.

BRIEF DESCRIPTION OF DRAWINGS

The following drawings attached to the present specification illustrate exemplary embodiments of the present invention and serve to further understand the technical spirit of the present invention together with the following detailed description of the present invention, and the present invention should not be interpreted as being limited to the items illustrated in the drawings.

FIG. 1 is a view illustrating a structure of a cylindrical secondary battery that adopts a top cap serving as a positive electrode terminal and a conductive washer serving as a negative electrode terminal according to a comparative example of the present invention, in which a separate connection plate component is applied to a lower portion of the top cap so as to be connected to a tab extended from an electrode assembly.

FIG. 2 is a view illustrating an external appearance of a cylindrical secondary battery according to an embodiment of the present invention.

FIG. 3 is a cross-sectional view illustrating an internal structure of the cylindrical secondary battery according to the embodiment of the present invention.

FIG. 4 is a view illustrating the structure of the cylindrical secondary battery according to the embodiment of the present invention, in which the connection plate component is eliminated as a positive electrode forging top cap is applied to the secondary battery illustrated in FIG. 1.

FIGS. 5 to 8 are partial cross-sectional views illustrating an upper structure of the cylindrical secondary battery according to the embodiment of the present invention.

FIGS. 9 and 10 are views illustrating a current collecting plate applied to the present invention.

FIGS. 11 and 12 are cross-sectional views illustrating a coupling structure between the current collecting plate and an electrode assembly applied to the present invention.

FIG. 13 is a partial cross-sectional view illustrating a lower structure of the cylindrical secondary battery according to the embodiment of the present invention.

FIG. 14 is a view illustrating a lower surface of the cylindrical secondary battery according to the embodiment of the present invention.

FIG. 15 is a schematic view illustrating a battery pack according to the embodiment of the present invention.

FIG. 16 is a conceptual view illustrating an automobile according to the embodiment of the present invention.

EXPLANATION OF REFERENCE NUMERALS AND SYMBOLS

5 Automobile
3: Battery pack
2: Pack housing
1: Cylindrical secondary battery
10 Electrode assembly
11: First electrode tab
12: Second electrode tab
20 Battery can
21: Beading portion
22: Crimping portion
22a: Insertion groove
23: Venting portion
30 Top cap
31: Protruding portion
32: Non-protruding portion
33: First surface (flat portion)
34: Second surface (exposed portion)
40 Conductive washer
41: Insertion protrusion
55 Insulative member
50 Second insulative member
60 First insulative member
70 Current collecting plate
71: Sub-plate
72: Lead
80 Insulation plate
81: Lead hole
90 Connection plate

BEST MODE

Hereinafter, exemplary embodiments of the present invention will be described in detail with reference to the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method. Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

Throughout the specification, unless explicitly described to the contrary, the word "comprise/include" and variations such as "comprises/includes" or "comprising/including" will be understood to imply the inclusion of stated elements, not the exclusion of any other elements. In addition, the term "unit", "part", or the like, which is described in the specification, means a unit that processes one or more functions or operations. In addition, throughout the specification, the term "A to B" means "A or more and B or less", i.e., a numerical value range including both A and B. Hereinafter, an embodiment of the present invention will be described with reference to the drawings.

The embodiment of the present invention provides a secondary battery including: an electrode assembly having a first electrode tab and a second electrode tab; a battery can electrically connected to the second electrode tab and having an opening portion configured to accommodate the electrode assembly; a top cap configured to cover the opening portion of the battery can and electrically connected to the first electrode tab; a conductive washer electrically connected to the battery can and configured to adjoin at least a part of a peripheral portion of the opening portion; and an insulative member provided between the top cap and the battery can and the conductive washer electrically connected to the battery can and configured to electrically insulate the top cap and at least one of the battery can and the conductive washer, in which the top cap includes first and second surfaces facing each other, the first surface faces the electrode assembly and is electrically connected to the first electrode tab, and the second surface has a protruding portion exposed through a hole formed in a central portion of the conductive washer.

The secondary battery includes the conductive washer, thereby implementing a unidirectional electrical connection in which a positive electrode terminal and a negative electrode terminal are provided in the same direction. In this case, a separate connection plate is not attached to a top cap that serves as the positive electrode terminal, but a tab extended from an electrode assembly may be attached directly to the top cap by welding. Therefore, it is possible to manufacture the top cap that reduces component resistance and increases energy density of the secondary battery.

In addition, the application of the above-mentioned configuration may increase rigidity of the top cap by means of a top cap component manufactured by forging.

The secondary battery may be a cylindrical secondary battery. The first electrode tab may be a non-coated portion of a first electrode current collector constituting the electrode assembly, the non-coated portion having no first electrode active material. The second electrode tab may be a non-coated portion of a second electrode current collector constituting the electrode assembly, the non-coated portion having no second electrode active material.

The first electrode tab and the second electrode tab may be bent toward a winding center of the electrode assembly.

Since the electrode tab is bent, it is possible to advantageously ensure low electrical resistance and increase energy density of the secondary battery.

Referring to FIGS. 2 to 7, a cylindrical secondary battery 1 according to an embodiment of the present invention includes an electrode assembly 10, a battery can 20, a top cap 30, a conductive washer 40, and an insulative member 55. The top cap 30 includes a first surface 33 and a second surface 34 facing each other. The first surface 33 faces the electrode assembly and is electrically connected to the first electrode tab 11. The second surface 34 has a protruding portion exposed through a hole formed in a central portion of the conductive washer 40.

The cylindrical secondary battery 1 may further include a current collecting plate 70 and/or an insulation plate 80 in addition to the above-mentioned components.

Referring to FIGS. 2 to 7, the electrode assembly 10 includes a first electrode plate having a first polarity, a second electrode plate having a second polarity, and a separator provided between the first electrode plate and the second electrode plate. The electrode assembly 10 may have a jelly-roll shape. That is, the electrode assembly 10 may be manufactured by winding a stack, which is made by sequentially stacking the first electrode plate, the separator, and the second electrode plate at least once, around a winding center C. In this case, a separator may be provided on an outer peripheral surface of the electrode assembly 10 to implement insulation from the battery can 20. The first electrode plate is a positive or negative plate, and the second electrode plate is an electrode plate having a polarity opposite to a polarity of the first electrode plate. For example, the first electrode plate may be a positive plate, and the second electrode plate may be a negative plate.

The first electrode plate includes the first electrode current collector and the first electrode active material applied onto one surface or two opposite surfaces of the first electrode current collector. The non-coated portion onto which no first electrode active material is applied is provided at one end of the first electrode current collector based on a width direction (a direction parallel to a Z-axis). The non-coated portion serves as the first electrode tab 11. The first electrode tab 11 is provided at an upper side of the electrode assembly 10 based on a height direction (the direction parallel to the Z-axis), and the electrode assembly 10 is accommodated in the battery can 20.

The second electrode plate includes the second electrode current collector and the second electrode active material applied onto one surface or two opposite surfaces of the second electrode current collector. The non-coated portion onto which no second electrode active material is applied is provided at the other end of the second electrode current collector based on the width direction (the direction parallel to the Z-axis). The non-coated portion serves as the second electrode tab 12. The second electrode tab 12 is provided at a lower side of the electrode assembly 10 based on the height direction (the direction parallel to the Z-axis), and the electrode assembly 10 is accommodated in the battery can 20.

That is, the first electrode tab 11 may be provided at one end of the electrode assembly, and the second electrode tab may be provided at the other end of the electrode assembly.

Referring to FIGS. 2 to 7, the battery can 20 may have a cylindrical shape. The battery can 20 may be provided in the form of a cylindrical receptacle having an opening portion. The battery can 20 may be made of a metallic material having conductivity. The battery can 20 accommodates the electrode assembly 10 through the opening portion and also accommodates an electrolyte.

The battery can 20 is electrically connected to the second electrode tab 12 of the electrode assembly 10. Therefore, the battery can 20 has the same polarity as the second electrode tab 12. For example, the second electrode tab 12 may be attached to the battery can 20 by welding.

The battery can 20 has a beading portion 21 and a crimping portion 22 provided at an upper end thereof. The crimping portion 22 may be provided on a peripheral portion of the opening portion of the battery can 20.

The beading portion 21 is formed at the upper side of the electrode assembly 10. The beading portion 21 is formed by pressing a periphery of an outer peripheral surface of the battery can 20. The beading portion 21 prevents the electrode assembly 10, which has a size corresponding to a width of the battery can 20, from being withdrawn through the opening portion of the upper end of the battery can 20. The beading portion 21 may serve as a support portion on which the top cap 30 is seated.

The crimping portion 22 is formed on an upper portion of the beading portion 21. The crimping portion 22 extends and bends to surround a part of an outer peripheral surface of the top cap 30 disposed on the beading portion 21 and surround a part of an upper surface of the top cap 30.

The battery can may have a cylindrical shape. A diameter of a circle of each of the two opposite ends of the battery can may be 30 mm to 55 mm, and a height of the battery can may be 60 mm to 120 mm. For example, a value of circular diameter×height of the cylindrical battery can may be 46 mm×60 mm, 46 mm×80 mm, 46 mm×90 mm, or 46 mm×120 mm.

In particular, for example, the cylindrical secondary battery may be a cylindrical secondary battery having a ratio of a form factor larger than about 0.4 (a ratio of the form factor is defined as a value made by dividing a diameter of the cylindrical secondary battery by a height of the cylindrical secondary battery, i.e., a ratio of a diameter φ to a height H).

In this case, the form factor means a value indicating the diameter and the height of the cylindrical secondary battery. For example, the cylindrical secondary battery according to the embodiment of the present invention may be 46110 cell, 48750 cell, 48110 cell, 48800 cell, 46800 cell, and 46900 cell. In the numerical value indicating the form factor, the first two numbers indicate a diameter of the cell, the next two numbers indicate a height of the cell, and the final number 0 indicates that a cross-section of the cell is circular.

The cylindrical secondary battery according to the embodiment of the present invention is an approximately cylindrical cell, and the cylindrical secondary battery may have a diameter of about 46 mm, a height of about 110 mm, and a ratio of the form factor of about 0.418.

The cylindrical secondary battery according to another embodiment is an approximately cylindrical cell, and the battery cell may have a diameter of about 48 mm, a height of about 75 mm, and a ratio of the form factor of about 0.640.

The cylindrical secondary battery according to still another embodiment is an approximately cylindrical cell, and the cylindrical secondary battery may have a diameter of about 48 mm, a height of about 110 mm, and a ratio of the form factor of about 0.418.

The cylindrical secondary battery according to yet another embodiment is an approximately cylindrical cell, and the battery cell may have a diameter of about 48 mm, a height of about 80 mm, and a ratio of the form factor of about 0.600.

The cylindrical secondary battery according to still yet another embodiment is an approximately cylindrical cell, and the battery cell may have a diameter of about 46 mm, a height of about 80 mm, and a ratio of the form factor of about 0.575.

The cylindrical secondary battery according to another further embodiment is an approximately cylindrical cell, and the cylindrical secondary battery may have a diameter of about 46 mm, a height of about 90 mm, and a ratio of the form factor of 0.511.

Referring to FIGS. 13 and 14, the battery can 20 may further include a venting portion 23 formed in a lower surface thereof. The venting portion 23 corresponds to a region having a smaller thickness than a peripheral region of the lower surface of the battery can 20. The venting portion 23 is structurally weak in comparison with the peripheral region. Therefore, when an abnormality occurs on the cylindrical secondary battery 1 and an internal pressure increases to a predetermined level or higher, the venting portion 23 is fractured, and gas produced in the battery can 20 is discharged.

The cylindrical secondary battery 1 according to the embodiment of the present invention has a structure in which both the positive electrode terminal and the negative electrode terminal are provided at the upper side of the cylindrical secondary battery 1, as described below. For this reason, the upper structure is more complicated than the lower structure. Therefore, the venting portion 23 may be formed in the lower surface of the battery can 20 to smoothly discharge gas produced in the battery can 20.

The drawing according to the present invention illustrates only the case in which the venting portion 23 is continuously formed while defining a circle on the lower surface of the battery can 20, but the present invention is not limited thereto. The venting portion 23 may be discontinuously formed while defining a circle on the lower surface of the battery can 20. Alternatively, the venting portion 23 may have a straight shape or other shapes.

Referring to FIGS. 2 to 7, the top cap 30 is a component made of a metallic material having conductivity and covers the opening portion of the battery can 20. The top cap 30 is electrically connected to the first electrode tab 11 of the electrode assembly 10 and electrically insulated from the battery can 20. Therefore, the top cap 30 may serve as a first electrode terminal of the cylindrical secondary battery 1.

The top cap 30 is seated on the beading portion 21 formed on the battery can 20 and fixed by the crimping portion 22.

The top cap 30 includes a first surface 33 and a second surface 34 facing each other. The first surface 33 faces the electrode assembly and is electrically connected to the first electrode tab 11. The second surface 34 includes a protruding portion 31 exposed through a hole formed in a central portion of the conductive washer 40.

The first surface 33 is directed toward the inside of the battery can, and the second surface 34 is directed toward the outside of the battery can. That is, the top cap 30 may have the protruding portion 31 protruding to the outside of the battery can, and the second surface 34 may be an exposed portion of the protruding portion 31 that is exposed through the hole formed in the central portion of the conductive washer 40.

The protruding portion 31 may protrude to be higher than an upper surface of the conductive washer 40 to be described below so that the protruding portion 31 easily comes into contact with the electrical connection component such as the busbar. The upper surface means a surface directed in a direction toward the outside of the battery can of the cylindrical battery, i.e., a direction toward the opening portion. The lower surface means a surface directed in a direction toward the bottom surface of the battery can.

The first surface 33 of the top cap 30 may be the flat portion electrically connected to the first electrode tab 11. The second surface 34 of the top cap 30 may be the exposed portion of the protruding portion 31 that is exposed through an outer surface of the conductive washer 40.

Therefore, the first electrode tab 11 may be electrically connected to the first surface 33 of the top cap 30 without attaching a separate connection plate component. For example, the first electrode tab 11 may be attached to the first surface 33 of the top cap 30 by welding. In this case, it is possible to reduce the number of components for electrical connection and thus reduce component resistance.

In addition, the top cap 30 may serve as the first electrode terminal of the cylindrical secondary battery 1 by means of the second surface 34 having the exposed portion exposed through the outer surface of the conductive washer 40 electrically connected to the electrode assembly. That is, the second surface of the protruding portion 31 may be exposed through the hole formed in the central portion of the conductive washer and serve as the first electrode terminal.

The top cap 30 includes a non-protruding portion 32 that does not have the protruding portion 31. A height of the protruding portion from the first surface 33 is larger than a height of the non-protruding portion 32 from the first surface 33.

A ratio between heights of the protruding portion 31 and the non-protruding portion 32 from the first surface 33 may be set in consideration of the peripheral components. The protruding portion 31 may protrude to be higher than an upper surface of the conductive washer 40 to be described below so that the protruding portion 31 easily comes into contact with the electrical connection component such as the busbar. The upper surface means a surface directed in a direction toward the outside of the battery can of the cylindrical battery, i.e., a direction toward the opening portion. The lower surface means a surface directed in a direction toward the bottom surface of the battery can.

That is, the height of the protruding portion from the first surface 33 may be larger than a value made by adding a thickness T1 of the crimping portion 22 and a thickness T2 of a portion of the conductive washer 40 adjoining the crimping portion 22 to the height of the non-protruding portion 32 from the first surface 33 (see FIG. 6).

The thickness T1 of the crimping portion 22 may be 0.1 mm or more, 0.15 mm or more, 0.2 mm or more, 0.25 mm or more, 0.3 mm or more, or 0.35 mm or more. The thickness T1 of the crimping portion 22 may be 0.75 mm or less, 0.7 mm or less, 0.65 mm or less, 0.6 mm or less, 0.55 mm or less, or 0.5 mm or less.

The thickness T2 of the portion of the conductive washer 40 adjoining the crimping portion 22 may be 0.25 mm or more, 0.3 mm or more, 0.35 mm or more, or 0.4 mm or more. The thickness T2 of the portion of the conductive washer 40 adjoining the crimping portion 22 may be 0.65 mm or less, 0.6 mm or less, 0.55 mm or less, or 0.5 mm or less.

The value made by summing up the thickness T1 of the crimping portion 22 and the thickness T2 of the portion of the conductive washer 40 adjoining the crimping portion 22 may be 0.35 mm or more, 0.4 mm or more, 0.45 mm or more, 0.5 mm or more, 0.55 mm or more, 0.6 mm or more, or 0.65 mm or more. The value made by summing up the thickness T1 of the crimping portion 22 and the thickness T2 of the portion of the conductive washer 40 adjoining the crimping portion 22 may be 1.4 mm or less, 1.35 mm or less, 1.3 mm or less, 1.25 mm or less, 1.2 mm or less, 1.15 mm or less, 1.1 mm or less, 1.05 mm or less, or 1 mm or less.

Therefore, the height of the protruding portion from the first surface 33 may be larger than a value made by summing up the height of the non-protruding portion 32 from the first surface 33 and 0.35 mm or more, 0.4 mm or more, 0.45 mm or more, 0.5 mm or more, 0.55 mm or more, 0.6 mm or more, 0.65 mm or more, 1.4 mm or less, 1.35 mm or less, 1.3 mm or less, 1.25 mm or less, 1.2 mm or less, 1.15 mm or less, 1.1 mm or less, 1.05 mm or less, or 1 mm or less.

On the basis of the ratio between the heights of the protruding portion 31 and the non-protruding portion 32 from the first surface 33, the second surface of the protruding portion 31 may be exposed through the hole formed in the central portion of the conductive washer and advantageously serve as the first electrode terminal.

FIG. 1 is a view illustrating a structure of a cylindrical secondary battery that adopts a top cap serving as a positive electrode terminal and a conductive washer serving as a negative electrode terminal according to a comparative example of the present invention, in which a separate connection plate component is applied to a lower portion of the top cap so as to be connected to a tab extended from an electrode assembly.

Referring to FIG. 1, in the structure of the cylindrical secondary battery in which the conductive washer 40 is applied to make a large negative electrode terminal, the protruding portion 31 of the positive electrode top cap, which protrudes by pressing the positive electrode top cap 30 to obtain a desired area of the conductive washer, may be inserted into the hole of the central portion of the conductive washer 40, and a connection plate component 90 may be attached to a lower surface of the top cap 30 to form a current path with the electrode assembly.

However, a positive electrode forging top cap may be applied to reduce resistance and the number of components in comparison with the case in which the connection plate component 90 is applied.

FIG. 4 is a view illustrating the structure of the cylindrical secondary battery according to the embodiment of the present invention, in which the connection plate component is eliminated as a positive electrode forging top cap is applied to the secondary battery illustrated in FIG. 1.

That is, FIG. 4 illustrates a structure in which a component, which serves as an external terminal of the positive electrode, and a component for welding the tab extended from the electrode assembly are integrally coupled. The positive electrode forging top cap configured as a single component may be manufactured by forging and thus have increased rigidity in comparison with the top cap in the related art, and the application of the single integrated component may also reduce component resistance.

The forging top cap 30 means a top cap manufactured by a forging process. The forging process means a process of forming the protruding portion 31 by applying pressure to the non-protruding portion 32 in the direction from the second surface 34 of the upper surface of the top cap 30 to the first surface 33.

The top cap 30 contains aluminum. Therefore, it is possible to increase rigidity in comparison with the top cap in the related art and ensure a space in which the tab extended from the electrode assembly may be welded.

As described above, the application of the positive electrode forging top cap component according to the present invention may allow the single component to perform two functions, i.e., a function of the external terminal of the positive electrode and a function of a component for attaching an inner tab. The forging process may obtain higher rigidity in comparison with the top cap component in the related art and obtain lower component resistance in comparison with the case in which the two components are separately applied.

Referring to FIGS. 2 to 8, the conductive washer 40 is made of a metallic material having conductivity. The conductive washer 40 is a component having an approximately disk shape having a hole formed in a central portion thereof.

The conductive washer 40 extends in a direction toward the central portion from the outer peripheral portion of the upper surface of the conductive washer 40 that adjoins the peripheral portion of the opening portion of the battery can. The conductive washer 40 has a hole formed in a central portion thereof so that the protruding portion 31 of the top cap 30 may be exposed.

The upper surface means a surface directed in a direction toward the outside of the battery can of the cylindrical battery, i.e., a direction toward the opening portion. The lower surface means a surface directed in a direction toward the bottom surface of the battery can. The central portion means a central region of the upper surface and/or the lower surface of the conductive washer 40.

The conductive washer 40 may be electrically connected to the battery can and adjoin at least a part of the peripheral portion of the opening portion or particularly adjoin the crimping portion 22 of the battery can 20. That is, the secondary battery has the crimping portion provided on the peripheral portion of the opening portion of the battery can, and the conductive washer 40 adjoins the crimping portion 22. As the conductive washer 40 adjoins the crimping portion 22, the conductive washer 40 may have the same polarity as the battery can and serve as a second electrode terminal having the second polarity.

The conductive washer 40 may be coupled to the crimping portion 22 by welding, for example. For example, the welding may be laser welding.

The conductive washer 40 is electrically insulated from the top cap 30. The top cap 30 is exposed through the hole formed in the central portion of the conductive washer 40. The conductive washer 40 is spaced apart from the protruding portion 31 of the top cap 30. In addition, the conductive washer 40 is spaced apart upward and downward from the remaining portion except for the protruding portion 31 of the top cap 30. Therefore, the conductive washer 40 may be electrically connected to the second electrode tab 12 and the battery can 20 and serve as the second electrode terminal of the cylindrical secondary battery 1.

That is, the cylindrical secondary battery 1 according to the embodiment of the present invention includes the conductive washer 40, such that the cylindrical secondary battery 1 has the structure in which both the first electrode terminal having the first polarity and the second electrode terminal having the second polarity are disposed in the same direction.

Referring to FIG. 5, a width D2 of the conductive washer 40 is larger than a width D1 of the upper surface of the crimping portion 22 of the battery can 20.

This is to increase a coupling area between the electrical connection component and the conductive washer 40 when the electrical connection component such as the busbar is coupled to the conductive washer 40 in order to connect the plurality of cylindrical secondary batteries 1. Since the coupling area between the electrical connection component and the conductive washer 40 is increased as described above, the welding process may be smoothly performed, the fastening force between the two components may be increased, and the electrical resistance on the coupling portion may be reduced.

The upper surface means a surface directed in a direction toward the outside of the battery can of the cylindrical battery, i.e., a direction toward the opening portion. The lower surface means a surface directed in a direction toward the bottom surface of the battery can. The width D2 of the conductive washer 40 means a length extending in the direction toward the central portion from the outer peripheral portion of the upper surface of the conductive washer 40 that adjoins the peripheral portion of the opening portion of the battery can. The width D1 of the upper surface of the crimping portion 22 means a length extending from the peripheral portion of the opening portion of the battery can in the direction toward the central portion from the outer peripheral portion of the upper surface of the battery can. The upper surface of the crimping portion 22 means a portion at the end of the crimping portion 22 except for a curved portion that surrounds lateral and edge portions of the crimping portion 22.

The width D2 of the conductive washer 40 may be set to vary depending on the diameter of the secondary battery. The cylindrical secondary battery is an approximately cylindrical cell. For example, the width D2 of the conductive washer 40 may be 10% or more, 11% or more, 12% or more, or 13% or more of a maximum diameter of the cell. The cylindrical secondary battery is an approximately cylindrical cell. For example, the width D2 of the conductive washer 40 may be 50% or less, 45% or less, 43% or less, or 40% or less of the maximum diameter of the cell.

The width D1 of the upper surface of the crimping portion 22 is smaller than the width D2 of the conductive washer 40. The cylindrical secondary battery is an approximately cylindrical cell. For example, the width D1 of the upper surface of the crimping portion 22 may be 1% or more, 2% or more, or 3% or more of the maximum diameter of the cell. The cylindrical secondary battery is an approximately cylindrical cell. For example, the width D1 of the upper surface of the crimping portion 22 may be 13% or less, 12% or less, 11% or less, or 10% or less of the maximum diameter of the cell.

Referring to FIG. 6, a sum of a thickness T1 of a portion of the crimping portion 22 adjoining the conductive washer 40 and a thickness T2 of a portion of the conductive washer 40 adjusting the crimping portion 22 is 90% to 200% of a thickness T' of a portion of the conductive washer 40 that does not adjoin the crimping portion 22.

For example, the thickness T1 of the crimping portion 22 may be 0.1 mm or more, 0.15 mm or more, 0.2 mm or more, 0.25 mm or more, 0.3 mm or more, or 0.35 mm or more. The thickness T1 of the crimping portion 22 may be 0.75 mm or less, 0.7 mm or less, 0.65 mm or less, 0.6 mm or less, 0.55 mm or less, or 0.5 mm or less.

The thickness T2 of the portion of the conductive washer 40 adjoining the crimping portion 22 may be 0.25 mm or more, 0.3 mm or more, 0.35 mm or more, or 0.4 mm or more. The thickness T2 of the portion of the conductive washer 40 adjoining the crimping portion 22 may be 0.65 mm or less, 0.6 mm or less, 0.55 mm or less, or 0.5 mm or less.

The thickness T' of the portion of the conductive washer 40, which does not adjoin the crimping portion 22, may be 0.4 mm or more, 0.45 mm or more, or 0.5 mm or more. The thickness T' of the portion of the conductive washer 40, which does not adjoin the crimping portion 22, may be 0.7 mm or less, 0.65 mm or less, or 0.6 mm or less.

When the thickness of the conductive washer is set to vary depending on the region, the metal thickness may be constant in all routes for electric current, thereby reducing overall resistance.

Meanwhile, referring to FIG. 8, the battery can 20 may include an insertion groove 22a provided in the upper surface of the crimping portion 22. The conductive washer 40 may include an insertion protrusion 41 having a shape corresponding to the insertion groove 22a and coupled to the insertion groove 22a.

The insertion groove 22a and the insertion protrusion 41 may increase the contact area between the conductive washer 40 and the crimping portion 22, thereby increasing the fastening force and reducing the electrical resistance on the coupling portion. In addition, the insertion groove 22a and the insertion protrusion 41 may guide a seating position of the conductive washer 40 when the conductive washer 40 is seated on the crimping portion 22, thereby preventing the contact between the conductive washer 40 and the protruding portion 31 of the top cap 30. In addition, the insertion groove 22a and the insertion protrusion 41 may prevent the conductive washer 40 from moving on the crimping portion 22 during the welding process, thereby improving the process performance.

Referring to FIGS. 2 to 7, the insulative member 55 is provided between the top cap 30 and at least one of the battery can 20 and the conductive washer 40 electrically connected to the battery can, and electrically insulates the top cap 30 and at least one of the battery can 20 and the conductive washer 40. According to one embodiment, the insulative member 55 may electrically insulate the top cap 30 and both of the battery can 20 and the conductive washer 40.

The insulative member 55 includes a first insulative member 60 provided between the conductive washer 40 and the top cap 30 and configured to electrically insulate the conductive washer 40 and the top cap 30, and a second insulative member 50 provided between the battery can and the top cap and configured to electrically insulate the battery can and the top cap. The insulative member 55 is made of a material having insulation.

The second insulative member 50 is provided between the battery can 20 and the top cap 30 and electrically insulates the battery can and the top cap. For example, the second insulative member 50 may be a gasket. The second insulative member 50 may be provided between the top cap 30 and the crimping portion 22 of the battery can 20, thereby ensuring sealability of the battery can 20 and electrically insulating the portion between the battery can 20 and the top cap 30.

According to the cylindrical secondary battery 1 according to the embodiment of the present invention, the top cap 30 serves as the first electrode terminal having the first polarity, and the conductive washer 40 serves as the second electrode terminal having the second polarity opposite to the first polarity. Therefore, the top cap 30 and the conductive washer 40 need to be kept in an electrically insulated state. Therefore, the first insulative member 60 may be applied to stably maintain the insulated state.

The first insulative member 60 may be provided between the top cap 30 and the lower surface of the conductive washer 40. As described above, the conductive washer 40 has the width D2 larger than the width D1 of the upper surface of the crimping portion 22 and extends in the direction from the crimping portion 22 toward the protruding portion 31 of the top cap 30. Therefore, the first insulative member 60 may extend to cover an inner surface of the hole formed in the central portion of the conductive washer 40 so that the inner surface of the hole formed in the conductive washer 40 cannot come into contact with the protruding portion 31 of the top cap 30.

When the first insulative member 60 is made of a resin material, the first insulative member 60 may be coupled to the conductive washer 40 and the top cap 30 by thermal bonding. In this case, sealability may be improved at the coupling interface between the first insulative member 60 and the conductive washer 40 and the coupling interface between the first insulative member 60 and the top cap 30.

Referring to FIG. 8, the first insulative member 60 may extend to cover an area of 1% or more, 2% or more, 3% or more, or 4% or more of the overall area of the upper surface of the conductive washer 40. The first insulative member 60 may extend to cover an area of 10% or less, 9% or less, 8% or less, or 7% or less of the overall area of the upper surface of the conductive washer 40. When the above-mentioned range is satisfied, the effect of preventing the contact between the conductive washer 40 and the top cap 30 may be further improved.

A width C by which the first insulative member 60 extends to cover a part of the upper surface of the conductive washer 40 may be 0.1 mm or more, 0.15 mm or more, 0.2 mm or more, 0.25 mm or more, 0.3 mm or more, or 0.35 mm or more. The width C by which the first insulative member 60 extends to cover a part of the upper surface of the conductive washer 40 may be 3 mm or less, 2.5 mm or less, 2 mm or less, 1.5 mm or less, 1 mm or less, or 0.5 mm or less.

The width C by which the first insulative member 60 extends to cover a part of the upper surface of the conductive washer 40 means a length of a portion covered by the first insulative member 60 in a direction from the central portion toward the outer peripheral portion of the width D2 of the conductive washer 40. The width D2 of the conductive washer 40 may be set to vary depending on the diameter of the secondary battery. The cylindrical secondary battery is an approximately cylindrical cell. For example, the width D2 of the conductive washer 40 may be 10% or more, 11% or more, 12% or more, or 13% or more of a maximum diameter of the cell. The cylindrical secondary battery is an approximately cylindrical cell. For example, the width D2 of the conductive washer 40 may be 50% or less, 45% or less, 43% or less, or 40% or less of the maximum diameter of the cell.

When the first insulative member 60 extends to the edge region of the upper surface of the conductive washer 40 as described above, the process of seating the conductive washer 40 on the crimping portion 22 may be more accurately and quickly performed. The first insulative member 60 is inserted through the hole of the conductive washer 40 and fixed to the conductive washer 40, and then the coupled body including the conductive washer 40 and the first insulative member 60 is seated on the crimping portion 22 and the top cap 30, such that the conductive washer 40 may be naturally seated on an accurate position. In this case, the protruding portion 31 of the top cap 30 is exposed to the outside of the battery can through the hole formed in the central portion of the first insulative member 60.

The coupled body of the first insulative member 60 and the conductive washer 40 illustrated in FIG. 8 may be manufactured by insert injection molding. That is, the insert injection molding is performed so that the conductive washer 40 made of a metallic material is inserted into/fixed to the first insulative member 60 made of a resin material, such that the coupled body of the first insulative member 60 and the conductive washer 40 may be manufactured. As the coupled body is disposed on the crimping portion 22 and the top cap 30, the alignment may be naturally performed.

Referring to FIGS. 2 to 7, the current collecting plate 70 is connected to the upper portion of the electrode assembly 10. The current collecting plate 70 is made of a metallic material having conductivity and connected to the first electrode tab 11. A lead 72 may be connected to the current collecting plate 70. The lead 72 may extend upward from the electrode assembly 10 and be coupled directly to the first surface 33 of the top cap 30. Since the top cap 30 has the first surface 33 capable of being electrically connected to the first electrode tab 11, the lead 72 is not coupled to the connection plate 90 that may be coupled to the first surface 33 of the top cap 30. Since the lead 72 is coupled directly to the first surface 33 of the top cap 30 without being coupled to the connection plate 90, it is possible to reduce the number of components to be electrically connected and reduce component resistance.

Referring to FIGS. 9 and 10, the current collecting plate 70 may include a plurality of sub-plates 71 radially extending from a central portion thereof. The current collecting plate 70 and the lead 72 may be integrated. In this case, like the sub-plate 71, the lead 72 may be provided in the form of a long plate extending outward from the central portion of the current collecting plate 70. The lead 72 may be formed between the adjacent sub-plates 71. However, the present invention is not limited by the structure of the current collecting plate 70. The current collecting plate 70 may have a shape corresponding to the upper surface of the electrode assembly 10 so as to cover the entire upper portion of the first electrode tab 11.

Although not illustrated in the drawings, the current collecting plate 70 may include a plurality of concave-convex portions radially formed on the lower surface thereof. When the concave-convex portions are formed, the concave-convex portions may be pressed into the electrode tabs 11 and 12 by pushing the current collecting plate 70.

Referring to FIG. 11, the current collecting plate 70 is coupled to the end of the first electrode tab 11. For example, the first electrode tab 11 and the current collecting plate 70 may be coupled by laser welding. The laser welding may be performed by partially melting a base material of the current collecting plate 70. Alternatively, the laser welding may be performed in a state in which welding solder is interposed between the current collecting plate 70 and the first electrode tab 11. In this case, the solder may have a lower melting point than the current collecting plate 70 and the first electrode tab 11.

Referring to FIG. 12, the current collecting plate 70 may be coupled to a coupling surface formed by bending the end of the first electrode tab 11 in a direction parallel to the current collecting plate 70. For example, the bending direction of the first electrode tab 11 may be a direction toward the winding center of the electrode assembly 10. In the case in which the first electrode tab 11 has a bent shape as described above, a space occupied by the first electrode tab 11 may be reduced, thereby improving energy density.

Referring to FIG. 13, the current collecting plate 70 may also be coupled to the lower surface of the electrode assembly 10. In this case, one surface of the current collecting plate 70 may be coupled to the second electrode tab 12 of the electrode assembly 10 by welding, and the other surface of the current collecting plate 70 may be coupled to the bottom surface in the battery can 20 by welding. The coupling structure between the second electrode tab 12 and the current collecting plate 70 coupled to the lower surface of the electrode assembly 10 is substantially identical to the current collecting plate 70 coupled to the upper surface of the electrode assembly 10.

Although not illustrated in the drawings, like the first electrode tab 11, the second electrode tab 12 may also have a shape bent in the direction toward the winding center of the electrode assembly 10.

The insulation plate 80 is disposed between the beading portion 21 and the upper end of the electrode assembly 10 or between the beading portion 21 and the current collecting plate 70 coupled to the upper portion of the electrode assembly 10 and prevents the contact between the first electrode tab 11 and the battery can 20 or the contact between the current collecting plate 70 and the battery can 20.

The insulation plate 80 has a lead hole 81 through which the lead 72, which extends upward from the current collecting plate 70 or the first electrode tab 11, may be extended.

The lead 72 is extended upward through the lead hole 81 and coupled to a lower surface of the connection plate 90 or a lower surface of the top cap 30. As described above, the cylindrical secondary battery 1 according to the embodiment of the present invention has a structure in which the top cap 30 and the conductive washer 40 provided at one side of the battery can 20 based on the longitudinal direction (the direction parallel to the Z-axis in FIG. 2) may be used as the first electrode terminal and the second electrode terminal, respectively. Therefore, when the plurality of cylindrical secondary batteries 1 according to the embodiment of the present invention are electrically connected, the electrical connection component such as the busbar may be disposed at only one side of the cylindrical secondary battery 1. Therefore, it is possible to simplify the structure and improve the energy density.

Referring to FIG. 15, a battery pack 3 according to the embodiment of the present invention includes: a secondary battery assembly configured by electrically connecting the secondary batteries 1 according to the embodiment of the present invention described above; and a pack housing 2 configured to accommodate the secondary battery assembly. For convenience of illustration in the drawings, components such as a busbar and an electric power terminal for electrical connection are omitted from the drawings according to the present invention.

Referring to FIG. 16, for example, an automobile 5 according to the embodiment of the present invention may be an electric automobile and includes the battery pack 3 according to the embodiment of the present invention. The automobile 5 operates by receiving electric power from the battery pack 3 according to the embodiment of the present invention.

The present invention has been described with reference to the limited embodiments and the drawings, but the present invention is not limited thereto. The described embodiments may be changed or modified by those skilled in the art to which the present invention pertains within the technical spirit of the present invention and within the scope equivalent to the appended claims.

The invention claimed is:

1. A secondary battery comprising:
   an electrode assembly having a first electrode tab and a second electrode tab;
   a battery can electrically connected to the second electrode tab, the battery can having an opening portion configured to accommodate the electrode assembly;
   a top cap configured to cover the opening portion of the battery can, the top cap being electrically connected to the first electrode tab;
   a conductive washer electrically connected to the battery can, the conductive washer adjoining at least a portion of a peripheral portion of the opening portion; and
   an insulative member located between the top cap and at least one of the battery can and the conductive washer, the insulative member being configured to electrically insulate the top cap from the at least one of the battery can and the conductive washer, wherein the top cap comprises a first surface and a second surface opposite each other, the first surface facing the electrode assembly, the first surface being electrically connected to the first electrode tab, and the second surface having a protruding portion exposed through a hole located at a central portion of the conductive washer.

2. The secondary battery of claim 1, wherein the top cap comprises a non-protruding portion that does not have the protruding portion, and wherein a height of the protruding portion from the first surface is larger than a height of the non-protruding portion from the first surface.

3. The secondary battery of claim 1, wherein the top cap contains aluminum.

4. The secondary battery of claim 1, wherein the battery can has a cylindrical shape.

5. The secondary battery of claim 1, wherein the insulative member comprises:

a first insulative member located between the conductive washer and the top cap, the first insulative member being configured to electrically insulate the conductive washer from the top cap; and a second insulative member located between the battery can and the top cap, the second insulative member being configured to electrically insulate the battery can from the top cap.

6. The secondary battery of claim 5, wherein the first insulative member covers an inner surface of a hole located at a central portion of the conductive washer.

7. The secondary battery of claim 5, wherein the first insulative member extends to cover an area of 1% or more and 10% or less of an overall area of an upper surface of the conductive washer.

8. The secondary battery of claim 5, wherein the first insulative member is coupled to the conductive washer and the top cap by thermal bonding.

9. The secondary battery of claim 1, wherein a crimping portion is provided on the peripheral portion of the opening portion of the battery can, and wherein the conductive washer adjoins the crimping portion.

10. The secondary battery of claim 9, wherein a width between an inner diameter and an outer diameter of the conductive washer is larger than a width between an inner diameter and an outer diameter of an upper surface of the crimping portion.

11. The secondary battery of claim 9, wherein a sum of a thickness of a portion of a crimping portion adjoining the conductive washer and a thickness of a portion of the conductive washer adjoining the crimping portion is 90% to 200% of a thickness of a portion of the conductive washer that does not adjoin the crimping portion.

12. The secondary battery of claim 9, wherein the battery can comprises an insertion groove located in an upper surface of the crimping portion.

13. The secondary battery of claim 12, wherein the conductive washer comprises an insertion protrusion having a shape corresponding to the insertion groove, the insertion protrusion being coupled to the insertion groove.

14. The secondary battery of claim 1, wherein the battery can comprises a venting portion formed in a lower surface thereof.

15. The secondary battery of claim 1, wherein the first electrode tab is a non-coated portion of a first electrode current collector of the electrode assembly, the non-coated portion of the first electrode current collector having no first electrode active material, and wherein the second electrode tab is a non-coated portion of a second electrode current collector of the electrode assembly, the non-coated portion of the second electrode current collector having no second electrode active material.

16. The secondary battery of claim 1, wherein the first electrode tab and the second electrode tab are bent toward a winding center of the electrode assembly.

17. A battery pack comprising:

the secondary battery according to claim 1; and a pack housing configured to accommodate the secondary battery.

18. An automobile comprising the battery pack according to claim 17.

* * * * *